United States Patent [19]
Bauer et al.

[11] 3,909,711
[45] Sept. 30, 1975

[54] TRANSDUCER FOR SENSING A VARIATION OF A MAGNETIC FIELD ON A CONVEYOR BELT

[75] Inventors: Kunibert Bauer, Nagold; Manfred Guttinger, Leinfelden, both of Germany

[73] Assignee: Sandco Ltd., Canada

[22] Filed: Apr. 25, 1974

[21] Appl. No.: 464,325

Related U.S. Application Data

[63] Continuation of Ser. No. 275,153, July 26, 1972, abandoned.

[30] Foreign Application Priority Data
July 28, 1971   Germany............................ 2137700

[52] U.S. Cl............................................... 324/43 R
[51] Int. Cl.² ........................................ G01R 33/02
[58] Field of Search............... 324/43, 45, 46, 34 R; 307/309

[56] References Cited
UNITED STATES PATENTS
3,666,080   5/1972   Alfredsson........................... 324/45
3,670,239   6/1972   Shiraiwa et al. .................... 324/43 R
3,706,027   12/1972  Grice, Jr. et al. .................. 324/34 R

OTHER PUBLICATIONS

Strong, C. L., The Amateur Scientist, Scientific American; Vol. 213 No. 1, July, 1965; pp. 106–110.

Sony; Sony Magnetodiode; Sony Corporation pp. 1–4.

Alfredsson, Ger. Published application 2,020,834, Nov. 1970.

Primary Examiner—Robert J. Corcoran
Attorney, Agent, or Firm—Craig & Antonelli

[57] ABSTRACT

A transducer for sensing the occurrence of a variation of a magnetic field on an article, and more particularly for sensing a magnetized spot on a steel belt, the transducer includes at least one magnetic-field responsive semiconductor diode connected to voltage supply means and connected to a high resistance input of an amplifier via an alternating voltage coupling.

20 Claims, 4 Drawing Figures

TRANSDUCER FOR SENSING A VARIATION OF A MAGNETIC FIELD ON A CONVEYOR BELT

This is a continuation of application Ser. No. 275,153 filed July 26, 1972, now abandoned.

The present invention relates to a transducer for sensing a variation of a magnetic field on an article, and more particularly for determining the presence of a magnetized part on a steel conveyor belt which travels at a low speed.

In the German patent application P 20 20 834.8 it has been proposed to employ a Hall-effect generator or a magnetic diode as a transducer element for sensing the presence of a slowly varying magnetic field, for example, of a magnetic spot which has been magnetized on a slowly traveling steel belt. This transducer element is located underneath the steel belt which is to be examined, and its output signal is conducted via a direct-current amplifier to a comparison circuit in which the output signal is compared with a reference signal.

It is often necessary to operate such transducers under very highly differing temperatures. If, for example, a steel conveyer belt is employed in an unheated stockroom, temperatures down to −20°C and less may be encountered in winter, while maximum temperatures of more than +60°C may be encountered in summer. It has been found that because of the temperature sensitivity of the transducer elements employed their output signals are also highly dependent upon the temperature so that such transducers must be frequently readjusted. Furthermore, for amplifying the output signal of these transducer elements it is normally necessary to employ additional parts of soft iron for the purpose of concentrating the flux upon the transducer elements. These soft-iron parts have been found to retain a residual magnetization over a longer period of time which also affects the output signal to a certain extent so that these parts must be periodically demagnetized in order to avoid faulty results. It is readily apparent that there additional control operations are undesirable.

It is therefore an object of this invention to provide a transducer which will operate properly for longer periods of time without requiring any readjusting of its elements.

According to the present invention, this may be attained in such a manner that for sensing a variation of the magnetic field, at least one field-responsive semiconductor diode is provided which is connected to a preferably stabilized supply voltage, and that the output signal of this diode is conducted via an A.C. voltage coupling to a highly resistive input of an amplifier. The A.C. voltage coupling has the result that very slow variations of the output signal of the field-responsive diode, for example, variations which are due to temperature changes or variations which are caused by a slow magnetization of soft-iron parts, will not affect the amplifier and will therefore be ineffective so that such changes will also not influence the output signal of the transducer.

According to another feature of the present invention for further reducing the temperature-sensitivity of the field-responsive diodes and for attaining an improvde linearity of the indication, there is provided a series connection, of two field-responsive semiconductor diodes so that in operation these diodes are arranged in magnetic opposition. Such an arrangement has the advantage of having a very good linearity of the dependence of the output signal upon the strength of the magnetic field.

In accordance with a further feature of the present invention, the transducer includes a circuit arrangement for determining low-frequency field variations having an amplifier with a low-pass characteristic and having an upper cutoff frequency which preferably lies within the range of 1 to 10 kilocycles per second and preferably amounts to approximately 2 kilocycles. Such an arrangement permits, on the one hand, a low-frequency signal to be fully determined wherein the frequency lies, for example, between 0.1 and 2 cycles, and on the other hand it prevents any interference voltages of a higher frequency, for example, inductive voltage peaks of magnetic valves from producing false results.

The above discussed and other objects, features and advantages of the present invention will become more apparent from the following description thereof, when taken in connection with the accompanying drawings, wherein.

Figure 1:
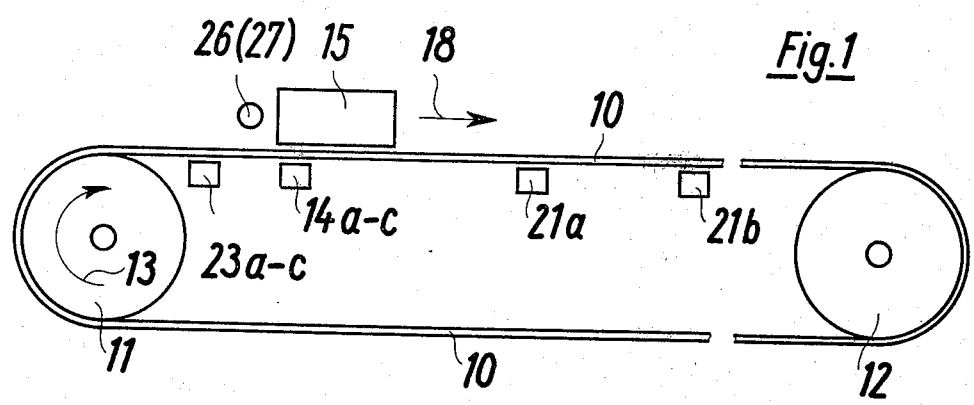
FIG. 1 shows a side view of a conveyer belt assembly which is equipped with a transducer according to the invention.
Figure 2:
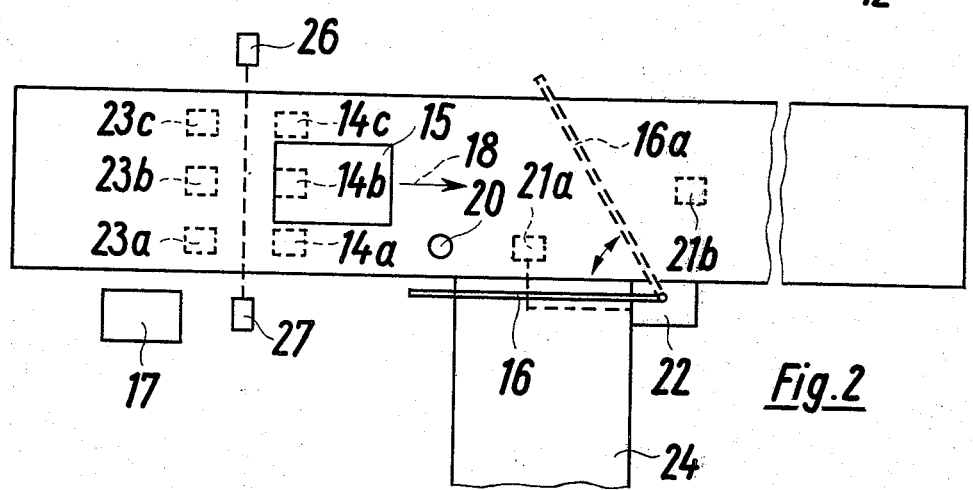
FIG. 2 shows a top view of the conveyer belt assembly according to FIG. 1.

Referring now to the drawings, FIGS. 1 and 2 show a steel conveyer belt 10 mounted on rollers 11 and 12, roller 11 being driven in the direction of the arrow 13 so that a package 15 which is placed upon the belt 10 will by conveyed toward the right in the direction of the arrow 18. Laterally of and along this belt 10, several receiving stations are located with only a single station 24 being illustrated. If such a receiving station is activated, it will stop with forward movement of the package 15 which is placed upon the belt 10 near the roller 11 and deflect the latter from the belt 10. The operator selects the particular receiving station desired to be activated by operating a certain key on a switchboard 17.

Underneath the belt 10, electromagnets 14a, 14b, and 14c are mounted in a row extending parallel to the roller 11 as shown in FIG. 2. Above the belt 10 and between the roller 11 and the electromagnets 14, a lamp 26 is mounted at one side of belt 10 and at the other side of the belt and opposite to this lamp a photoelectric cell 27 is mounted so that the light beam from the lamp 26 will fall upon the photoelectric cell 27. In accordance with the activation of the switchboard 17, one of the electromagnets 14 will be energized for a short time when the package 15 interrupts the light beam passing from the lamp 26 in the direction toward the photoelectric cell 27. If the package 15 is to be conveyed, for example, to the receiving station 24, the electromagnet 14a is energized, whereby a magnetized spot 20 will be produced in the belt 10 at a point in front of the package 15, and this magnetized spot then travels with the package toward the right.

Also arranged beneath the belt 10 are several transducer devices, two of which devices 21a and 21b are illustrated, and which serve for sensing the magnetized spots 20. With each receiving station a separate transducer device is associated which is spaced at the same distance from the edge of the belt 10 as the associated electromagnet 14. Thus, for example, as shown in FIG. 2, the transducer device 21a senses the magnetized spots 20 which are produced by the electromagnet 14a, while the transducer device 21b senses the magnetized spots which are produced by the electromagnetic 14b.

Each receiving station 24 is provided with a pivotable element 16 which may be provided by a drive mechanism 22, for example, a motor or an electromagnet, into the path of travel of the package 15, as indicated in FIG. 2 by the position 16a. The element 16 thus serves for guiding the package 15 toward the receiving station 24. The transducer device 21a actuates the drive mechanism 22 in such a manner that, when the magnetized spot 20 arrives at the transducer device 21a, the mechanism 22 will be activated for a predetermined length of time and during this time it will hold the element 16 pivoted to the position 16a. When this time has expired, the element 16 will return automatically to its original position. During the further travel of the belt, the magnetized spot 20 will travel past one of the three demagnetizing coils 23a, 23b and 23c which are mounted underneath the belt 10 near the roller 11 and the belt 10 is thereby demagnetized. Further embodiments of the arrangement as herein described are disclosed in the German published application 20 20 834.8.

Since the belt 10 usually runs at a relatively low speed of 100 to 120 meters per minute, the transducer devices must be very sensitive in order to properly respond. In addition to the requirement for sensitivity, due to the fact that such conveying mechanisms are often arranged in unheated warehouses, the transducer devices must operate properly within a temperature range of −20° to +60°C. It has also been found that in the magnetizable parts of such apparatus a certain remanent magnetization is gradually built up which also endangers the proper operation of the transducer devices 21.

Figure 3:
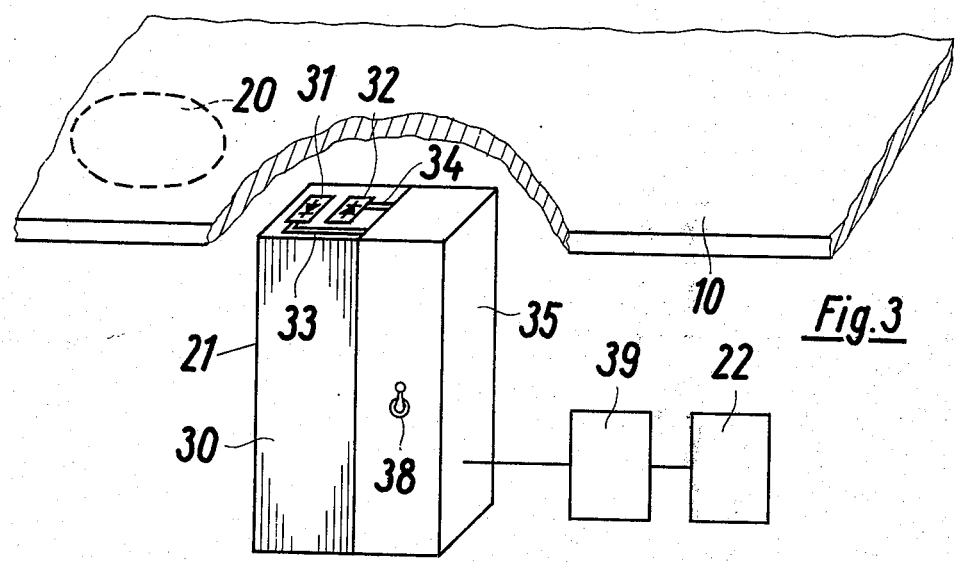
FIG. 3 shows, partly in section, an enlarged detail view of a transducer according to the invention which is provided with a concentrator for increasing the sensitivity and its relation with an associated steel conveyer belt.
Figure 4:
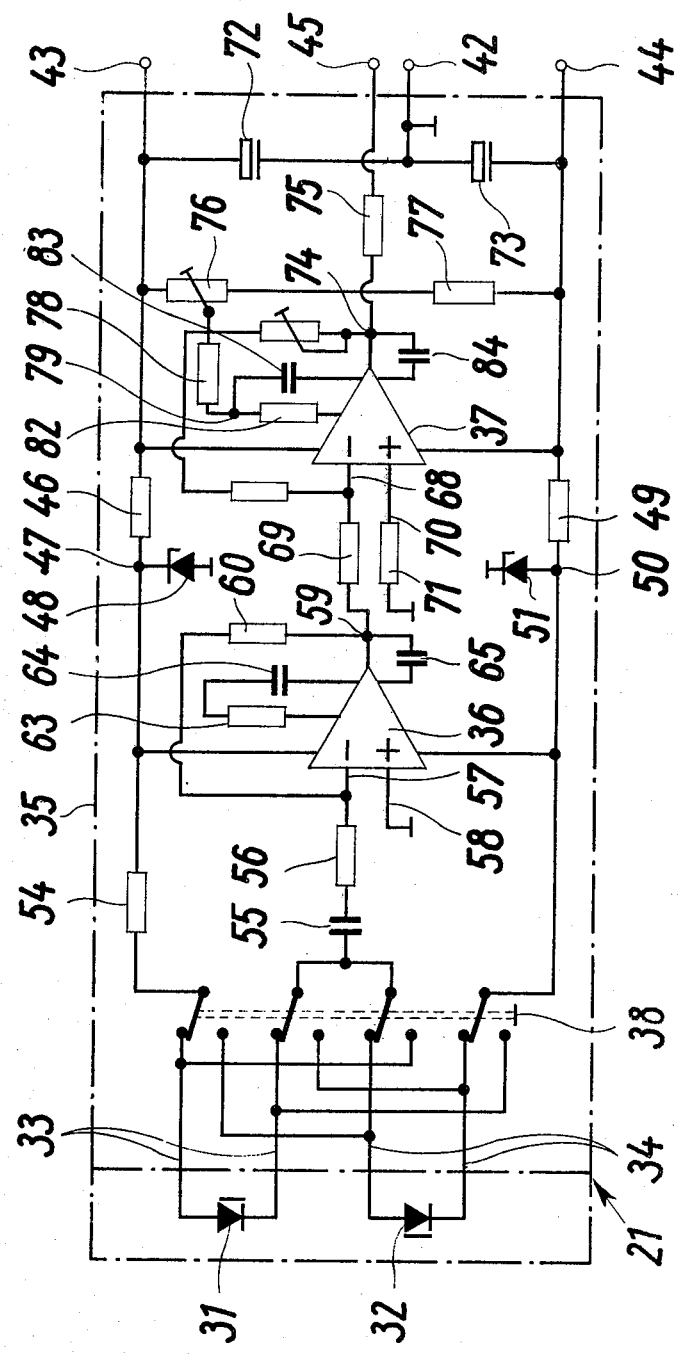
FIG. 4 shows a schematic circuit diagram of a transducer according to the invention.

FIG. 3 illustrates diagrammatically the positioning arrangement of a transducer device 21 underneath the belt 10 according to the present invention. The distance between this device and the belt should, of course, be made as small as possible in order to attain the highest possible sensitivity and to sense the presence of the magnetized spot 20 very reliably and accurately. As shown in FIG. 3, the transducer device 21 comprises a concentrator 30 which is composed of sheets of soft iron and on the upper side of which two magnetic-field-responsive semiconductor diodes 31 and 32 (hereafter called "magnet diodes") are mounted in such a manner that the diodes are arranged in series and oriented in opposite directions relative to the magnetic flux field emerging from the spot 20 In operation, these two diodes 31 and 32 are connected in series and thus produce an output signal which is an approximately linear function of the strength of the magnetic field H. These diodes are preferably selected in properly associated parts, i.e., selective pairing of diodes having the same characteristics. The leads 33 and 34 of these diodes connect to an amplifier 35 which, as illustrated in FIG. 4, comprises two individual operational amplifiers 36 and 37. The transducer device is provided with a switch 38 for switching from the detection of magnetized spots 20 with a north-south polarity to corresponding spots with a reverse polarity. Depending upon the adjustment position of the switch 38, the amplifier 35 will only respond to one particular polarity.

As illustrated in FIG. 3, a monostable multivibrator 39 is connected to the amplifier 35 and, in turn, controls the drive mechanism 22. If therefore a correctly polarixed spot 20 passes over the magnet diodes 31, 32, the amplifier 35 will emit an output signal which for a certain period of time, for example, 2 seconds, changes the multivibrator 39 to its unstable condition so that during this period the pivotable element 16 will be pivoted to its position 16a as indicated in FIG. 2 for deflecting the package 15 toward the receiving station 24.

FIG. 4 illustrates the details of the circuit of the amplifier 35 wherein for its current supply, one input 42 of the amplifier is connected to ground, another input 43 is connected to a positive potential of, for example, 12 volts, and another input 44 is connected to a corresponding negative potential of, for example, −12 volts. The output of the amplifier is indicated at 45 and depending upon the control required, a large variety of apparatus may be connected to this output 45, the multivibrator 39 (FIG. 3) being only one example of the different type of apparatus which may be employed.

The input 43 is connected to a resistor 46, the other end of which is connected via a junction 47 and a breakdown diode 48 to ground. The input 44 is connected in a similar manner to a resistor 49, the other end of which is connected via a junction 50 and a breakdown diode 51 to ground, The breakdown diodes 48 and 51 may have equal breakdown voltages of 5.6 volts so that in the operation of the apparatus, the junction 47 will have a constant potential of +5.6 volts and the junction 50 a potential of −5.6 volts relative to ground.

When the switch 38 is in the position as illustrated, the anode of the magnet diode 31 is connected via a resistor 54 of, for example, 620 ohms to the junction 47, while the cathode of diode 31 is connected to the anode of the diode 32 and via a capacitor 55 of, for example, 3 microfarads serving as an A.C. voltage coupling and a resistor 56 of, for example 220 kiloohms, to the input 57 of the operational amplifier 36. The other input 58 of the operational amplifier 36 is connected to ground. The operational amplifier 36 is supplied with current via leads connected to the junctions 47 and 50 and its output 59 is connected via a return resistor 60 of, for example, 560 kiloohms, to the input 57. For limiting the upper cutoff frequency to a valve of about 2 kilocycles, a resistor 63 and two capacitors 64 and 65 are provided wherein the resistor and capacitors have values of, for example, 1.5 kiloohms, 1nF, and 47 pF, respectively. The operational amplifier 36 is thus provided with a very high input resistance at a relatively low amplification so that the capacitor 55 which serves as the A.C. voltage coupling and preferably does not form an electrolytic capacitor may have a relatively low value, whereby a value of, for example, 0.1 to 0.3 cycles of the lower cutoff frequency of the transducer device 21 will be attained. As such, the amplifier 36 has a low-pass characteristic.

Since the operational amplifier 36 is an A.C. voltage amplifier, temperature-responsive variations of the characteristics of the diodes 31 and 32 of the apparatus according to the invention will exert only a very immaterial influence. A certain magnetization of the concentrator 30 which is unavoidable in actual practice of other constant magnetic fields in the vicinity of the concentrator are also without any effect since they will only produce a direct voltage component of the output signal of the diodes 31 and 32 and this component will not reach the amplifier 36. The resistor 54 has the effect that, when the apparatus is switched on, the input terminal 57 will be supplied with a predetermined polarity and therefore no undesired control function will occur.

The second operational amplifier 37 carries out the main amplification in the circuit arrangement of FIG. 4. One input 68 of this operational amplifier is connected via a resistor 69 to the output 59, while its other input 70 is connected via a resistor 70 to ground. The current supply is provided via leads connected to the inputs 43 and 44, each of which is connected to ground by a filter condenser 72 or 73, respectively. The output 74 of the operational amplifier 37 is connected via a resistor 75 of, for example, 150 ohms to the output 45. For producing a bias voltage for the amplifier 37, a voltage divider is provided which consists of two resistors 76 and 77 which are connected in series and connected between the inputs 43 and 44. A tap on the resistor 76 is connected via a resistor 78 to a junction 79 which, in turn, is connected on the one hand via a resistor 82 and on the other hand via a capacitor 83 to control inputs of the operational amplifier 37. A further control input is connected via a capacitor 84 to the output terminal 74.

The transducer apparatus as described operates as follows: If a magnetized spot 20 (FIGS. 2 and 3) passes over the concentrator 30 when switch 38 is correctly set, the two operational amplifiers 36 and 37 will be actuated and will then produce on the output 45, a signal which is almost entirely unaffected by the outer temperature and by constant magnetic fields in the concentrator 30 or in its vicinity. This signal on the output 45 may be employed, for example, as shown in FIG. 3 for actuating the multivibrator 39. By employing operational amplifiers it is possible to combine the concentrator 30 and the amplifier 35 into a compact structural unit the output terminal of which delivers a strong signal of, for example, 10 volts which may then be further conducted in a suitable manner to another apparatus. The low-pass characteristic of the amplifier 35 has the result that inductive voltage peaks, for example, of magnetic valves, will not be amplified by this amplifier and that such voltage peaks will not effect any undesired control functions.

Obviously, many modifications and variations of the present invention are possible in the light of the above teachings. It should therefore be understood that within the scope of the appended claims, the invention may be practiced otherwise than as specifically described.

We claim:

1. A transducer for sensing the occurrence of a variation of a magnetic field on an article, and more particularly for sensing a magnetized spot on a steel belt traveling at a low speed, the transducer comprising at least one semiconductor diode responsive to a magnetic field, said diode being connected to supply voltage means and providing an output signal to a high resistance input of an amplifier means via an alternating current coupling means, said coupling means being a nonelectrolytic capacitor of small capacitance connected to said diode and said amplifier means, said supply voltage means including stabilizing means, said amplifier means being provided with a low pass characteristic for determining low frequency variations of a magnetic field and being provided with an upper cutoff frequency in the range of 1 to 10 kc.

2. A transducer according to claim 1, comprising two magnetic field-responsive semiconductor diodes electrically connected in series, said diodes being oriented in opposite directions relative to the magnetic field.

3. A transducer according to claim 1, further comprising concentrator means associated with said at least one magnetic field responsive diode for concentrating the magnetic flux to be sensed upon said diode.

4. A transducer according to claim 3, wherein said concentrator means comprises an elongated soft-iron body through which the magnetic flux flows substantially in the longitudinal direction, and said diode being mounted on a longitudinal end of said soft-iron body.

5. A transducer according to claim 4, wherein said soft-iron body is formed of sheets of magnetic material.

6. A transducer according to claim 1, wherein the upper cutoff frequency if about 2 kc.

7. A transducer according to claim 1, wherein said amplifier means includes a first operational amplifier.

8. A transducer according to claim 7, wherein said supply voltage means includes two voltage source means for supplying current to said first operational amplifier, said two voltage source means being separately stabilized and being substantially symmetrical with respect to ground, said at least one diode being connected in series with at least one resistor connected to one of said voltage source means and to one input terminal of said first operational amplifier via said alternating current coupling means.

9. A transducer according to claim 7, further comprising a second operational amplifier, said second operational amplifier being connected to the output of said first operational amplifier.

10. A transducer according to claim 4, comprising an independent structural unit having said at least one field-responsive diode, said concentrator means and said amplifier arranged therein.

11. A transducer according to claim 2, further comprising concentrator means associated with said field-responsive diodes for concentrating the magnetic flux to be sensed upon said diodes.

12. A transducer according to claim 11, wherein said concentrator means comprises an elongated soft-iron body through which the magnetic flux flows substantially in the longitudinal direction, and said diodes being mounted on a longitudinal end of said soft-iron body.

13. A transducer according to claim 12, wherein said soft-iron body is formed of sheets of magnetic material.

14. A transducer according to claim 13, wherein the upper cutoff frequency is about 2 kc.

15. A transducer according to claim 2, wherein said amplifier means includes a first operational amplifier.

16. A transducer according to claim 15, wherein said supply voltage means includes two voltage source means for supplying current to said first operational amplifier, said two voltage source means being separately stabilized and being substantially symmetrical with respect to ground, said series connection of said two-field responsive semiconductor diodes being connected in series with at least one resistor between said two voltage sources, and the connection between said diodes being connected to one input terminal of said operational amplifier via said alternating current coupling means.

17. A transducer according to claim 16, wherein said amplifier means further includes a second operational amplifier connected to the output of said first operational amplifier.

18. A transducer according to claim 17, comprising concentrator means associated with said diodes for concentrating the magnetic flux to be sensed upon said diodes, and an independent structural unit having said diodes, said concentrator means and said amplifier means arranged therein.

19. A transducer according to claim 1, wherein said transducer is disposed such that said transducer is subjected to large ambient temperature variations.

20. A transducer according to claim 1, wherein the low frequency variations are approximately in the range of 0.1 to 0.3 cycles.

* * * * *